June 16, 1936.  G. G. PIERSON  2,044,366
METHOD FOR SEPARATION AND RECOVERY OF AU, PT, PD,
SE, TE, AND AS BY MEANS OF MERCUROUS SALTS
Filed Nov. 24, 1934
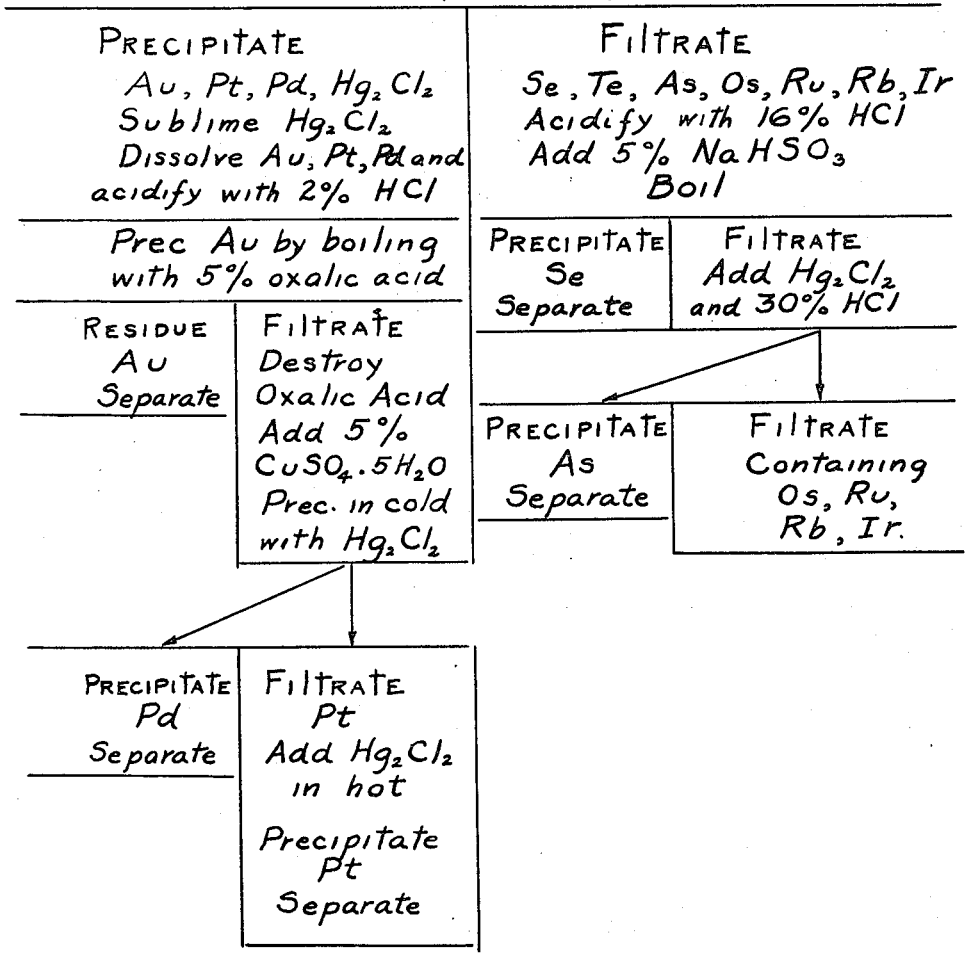
INVENTOR
Gordon Green Pierson
BY Wm. G Schmidt
ATTORNEY

UNITED STATES PATENT OFFICE 2,044,366

METHOD FOR SEPARATION AND RECOVERY OF AU, PT, PD, SE, TE, AND AS BY MEANS OF MERCUROUS SALTS

Gordon Green Pierson, Lansdale, Pa.

Application November 24, 1934, Serial No. 754,614

15 Claims. (Cl. 75—108)

My invention relates to an improved process of separating in elemental condition arsenic, selenium, tellurium, palladium, platinum, gold and analagous metals from their respective solutions by using under controlled conditions of acidity, temperature and in the presence of certain other chemical substances the practically insoluble mercurous salts.

To explain fully the advantages of my invention I shall refer briefly to the well known chemical reactions in which metals and certain soluble substances have the ability under well prescribed conditions to reduce certain elements from their solutions to an elemental state. For example, a solution of mercurous nitrate under favorable conditions readily precipitates metallic gold from solutions of gold chloride, bromide and other water-soluble compounds of gold. Also, it is well known, that certain organic and inorganic materials in colloidal or non-colloidal state can selectively adsorb certain substances such as dyes, metals in colloidal state, compounds, and gases from solutions in which they abound. These adsorbing materials for the most part, however, are required in great excess to approximate completeness in effecting a recovery by adsorption. In contrast, my process is remarkably distinguished by the fact that a relatively small excess of adsorbing material is required to effect an adsorption that readily goes to completion.

In order, therefore, to disclose explicitly the controlling factors and principles of my invention without obscuring its basic data with unnecessary minutiæ, I shall discuss it from four points of view: (1) the reducing action of insoluble mercurous salts on solutions of certain metals and non-metals, (2) the adsorption of precipitated elements by insoluble mercurous salts, (3) the factors of acidity, temperature and the presence of other chemical substances influencing the reduction and the adsorption of certain elements from their solutions by insoluble mercurous salts and (4) the virtually quantitative separation and recovery of Au, Pd, Pt, Se, Te and As.

Adverting to the first consideration—the reducing action of insoluble mercurous salts on the solutions of certain metals and non-metals—I have discovered that certain almost insoluble mercurous salts, e. g. the chloride, the bromide, and the iodide in particular, reduce rapidly, easily and completely solutions of the chlorides, the bromides and the other water-soluble compounds of arsenic, selenium, tellurium, palladium, platinum and gold to their elemental condition. The reaction that develops can be generally represented by the following equation:

$$MX + HgX = M + HgX_2$$

The preceding equation applies primarily to those salts from which the metals are precipitated. The reaction according to the equation is quantitative and the quantity of the insoluble mercurous salt added is always in excess of that required by a stoichiometrical calculation. The following data indicate only illustratively the proportional quantities of an insoluble mercurous salt like $Hg_2Cl_2$ and the element to be precipitated.

| Gold in milligrams | Color on .1 gram $Hg_2Cl_2$ |
|---|---|
| .2 | Dark purple |
| .1 | Pinkish purple |
| .05 | Purplish pink |
| .02 | Strong pink |
| .002 | Light pink |
| .000,2 | Very light pink |
| .000,05 | Faint coloration |

| Palladium in milligrams | Color on .1 gram $Hg_2Cl_2$ |
|---|---|
| .2 | Very dark gray |
| .05 | Gray |
| .01 | Light gray |
| .002 | Cream gray |
| .000,4 | Grayish cream |
| .000,05 | Faint cream |

| Platinum in milligrams | Color on .1 gram $Hg_2Cl_2$ |
|---|---|
| .1 | Dark gray |
| .02 | Gray |
| .01 | Creamish gray |
| .005 | Grayish cream |
| .001 | Cream |
| .000,2 | Slight cream |

| Selenium in milligrams | Color on .1 gram $Hg_2Cl_2$ |
|---|---|
| .2 | Salmon red when cold, bright red when warm |
| .05 | Salmon pink |
| .005 | Strong pinkish cream |
| .002 | Pink cream |
| .000,5 | Light cream |
| .000,2 | Faint cream |

| Tellurium in milligrams | Color on .1 gram $Hg_2Cl_2$ |
|---|---|
| .2 | Grayish yellow—turns grayish brown when hot |
| .05 | Cream yellow |
| .005 | Light cream yellow |
| .000,5 | Faint cream |

| Arsenic in milligrams | Color on .1 gram $Hg_2Cl_2$ |
|---|---|
| .1 | Bright deep brown |
| .01 | Pinkish brown |
| .001 | Pink |
| .000,1 | Cream |
| .000,02 | Very slight cream |

However, I have also observed that mercurous chloride in a typical transposition reaction precipitates iodine from solutions of soluble iodides. Although mercurous chloride is virtually insoluble and is not appreciably oxidized by substances that are possessed of active oxidizing properties, yet it is comparatively quickly and completely oxidized by the solutions of the aforementioned elements. As a quantitative result of a practically unidirectional reaction, solutions of the described elements are reduced to elemental condition and the mercurous chloride is oxidized to a mercuric state. Furthermore, I have observed that this reducing action of the insoluble mercurous salts is remarkably free from interference. Only those substances of extremely potent oxidizing or reducing effect obscure somewhat a clean cut separation of the elements of the solutions previously referred to. Starches, dextrins, blood and casein do not interfere with my process. However, nitrates, certain per salts, free halogens, stannous chloride and hypophosphites are preferably absent during the process of reduction; but, with the possible exception of nitrates, these substances are not likely to be encountered industrially. Cupric ions and ferric ions interfere with the mercurous chloride reduction of the described solutions in a varying manner. In the case of the separation of gold the concentrations of copper and iron should not exceed .06% and .12% respectively; of platinum, .06% and .06% respectively; of palladium, .06% of $Fe^{III}$; of selenium, .012% and .04% respectively; of tellurium, .06% and .04% respectively; and of arsenic, .006% and 1.2% respectively. It should be noted that the presence of cupric ions does not inhibit the reduction of a boiling solution of platinum, whereas palladium precipitates readily in a cold or hot solution; and, accordingly, a means for separating platinum and palladium becomes available. As illustrative of a complete and a thorough separation of an element from its solution as effected by the reducing agency of an insoluble salt of mercurous mercury, I have completely extracted gold from solutions containing as little as one part per billion by means of mercurous chloride.

The second phase of my invention—the adsorption of precipitated elements by insoluble mercurous salts—is of novel interest and importance. The insoluble mercurous salts not only precipitate the aforementioned elements from their respective solutions, but also adsorb these elements in a remarkably complete and rapid manner. Apparently, this phenomenon of adsorption is explained on the basis of the almost complete insolubility of the particles of the insoluble mercurous salts and in particular of mercurous chloride. The reduction of the solutions under consideration to the elemental stage most likely occurs at the surface of the small particles where the elements are fixed at once by adsorption. In processes in which the aspect of adsorption is to be emphasized I have discovered several methods for using mercurous chloride: (a) the mercurous chloride may be added directly in powdered form to the solution to be reduced and then separated from the solution after the desired elements have been adsorbed, (b) the solution may be passed through a cake of mercurous chloride using a filter of either the batch or the continuous type, (c) the insoluble mercurous salts may be precipitated or adsorbed on clay or other carriers for the purpose of extending their volume or increasing their adsorbing surface, and (d) the mercurous chloride can be formed directly in the solution by interacting a soluble mercurous salt with a soluble chloride in the solution. In using the third described method, I have observed that the reducing and the adsorbing efficiency of the insoluble mercurous salts is increased when these salts are extended on clay or other semi-colloidal solids. When elements like As, Au, Pt, Pd, Te and Se are thus adsorbed, I have further observed that they function efficiently as catalysts, insecticides, fungicides and colored pigments.

In discussing the third phase of my invention—the influence of the factors of acidity, temperature and the presence of other chemical substances on the reduction and the adsorption of certain elements from their solutions by insoluble mercurous salts—I shall define the conditions essential to the separation and the recovery of Au, Pt, Pd, Se, Te and As. Au, Pt and Pd are precipitated by mercurous halides from alkaline, neutral and acid solutions. A 1% concentration of HCl or its equivalent of $H_2SO_4$, HBr, etc. represents an optimum condition for the precipitation of Au, Pt and Pd by the mercurous salts. Gold is first separated by any standard method before the insoluble mercurous salt is added. Or if the gold is alone in the solution it can be removed by precipitation with mercurous chloride. Or if desired, all three elements—Au, Pt and Pd—can be precipitated and removed by mercurous chloride. But if the gold is first removed conventionally then to the solution of Pt and Pd remaining, a quantity of a cupric salt, preferably hydrated $CuSO_4$, is added to yield a solution of a concentration of the cupric salt of approximately 4% to 5%. Upon the addition of mercurous chloride, the Pd will precipitate from the cold solution. Boiling the solution, then results in a precipitation of the Pt. In the case of Se and Te in solution, these elements are not precipitated by mercurous chloride in a concentration of HCl less than approximately 5% to 6% or its equivalent of $H_2SO_4$, HBr, etc. and complete precipitation occurs only in a HCl acid concentration exceeding approximately 15%. As also is precipitated only from strongly acid solutions in a concentrations of HCl of approximately 25% or more. In disclosing the conditions under which the aforesaid elements can be reduced and adsorbed a number of significant factors must be emphasized. First, Au, Pt and Pd are reducible in alkaline, neutral, and weakly and strongly acid solutions. Secondly, $CuSO_4.5H_2O$ in a concentration of preferably 5% prevents the reduction of all of the aforementioned elements, excepting Pt and Pd. Thirdly, all other rare elements usually associated with Au, Pt, Pd, Se, Te and As—such as Os, Ru, Rb and Ir—can be separated as a group by virtue of their non-reduction by mercurous salts. It is, therefore, obvious from what I have discovered that by controlling the temperature and the concentrations of HCl and $CuSO_4.5H_2O$ insoluble mercurous salts are extremely effective in separating elements that are frequently indissolubly associated.

The fourth phase of my invention—the practically quantitative separation and recovery of Au, Pt, Pd, Se, Te and As from solutions of the chlorides, the bromides and the other water-soluble compounds of these elements and Ir—is best disclosed by setting forth in seriatim detail the several steps in the process. The solution of the salts of these elements is first acidified to a concentration of 1% or 2% of HCl or its equivalent in $H_2SO_4$, HBr, etc. Agitation or treatment of the solution with $Hg_2Cl_2$ removes Au, Pt and Pd which are filtered off. $Hg_2Cl_2$ is then sublimed and the residue of Au, Pt and Pd is dissolved by any conventional method and the pH of the solution is adjusted to approximately .6. Au is then separated and recovered by any conventional method. For example, oxalic acid is added to make a 5% solution from which Au can be precipitated in a boiling solution and removed by filtration. The filtrate containing Pd and Pt is evaporated almost to dryness with $H_2SO_4$ in order to decompose the oxalic acid. Should any element be precipitated during this evaporation it is redissolved with HCl and $KClO_3$. After the excess acid and the free chlorine have been expelled the solution is diluted with $H_2O$ in order that the HCl concentration be maintained below 4%. Then $CuSO_4.5H_2O$ is added to make a 5% cold solution from which $Hg_2Cl_2$ precipitates Pd. After the removal of Pd by filtration the filtrate is boiled gently for five minutes from which Pt is precipitated upon the addition of more $Hg_2Cl_2$. Reverting to the filtrate, resulting from the removal of combined Au, Pt and Pd, I then acidify the aforesaid filtrate with HCl or its equivalent in terms of $H_2SO_4$, HBr, etc. to a concentration of approximately 16%. Also to this acidified filtrate 5% of $NaHSO_3$ is added. It is allowed to stand for fifteen minutes and is then boiled gently to precipitate Se. The filtrate after the removal of Se contains Te, As and Ir from which the addition of $Hg_2Cl_2$ separates Te. After Te is removed by filtration, the filtrate is acidified with HCl to a concentration of approximately 30% or more and from it As can be precipitated by a further addition of $Hg_2Cl_2$. In the last filtrate, after the separation of As, there is present Ir. Other elements, i. e. Os, Ru, Rb, if present in the original solution, would also be associated with Ir in the last filtrate resulting from the separation of As. This procedure is illustrated in the schematic outline in the accompanying drawing.

However, the aforementioned procedure may be modified in many ways depending upon numerous combinations of the previously described elements. A few such combinations are accordingly described for the purpose of exemplification only.

(a) Solutions of Au, Se and As. By varying the concentration of HCl or its equivalent Au, Se and As can be separated and recovered. Au is precipitated by $Hg_2Cl_2$ in a substantially 2% HCl concentration; Se in a substantially 16% HCl concentration; and As in a substantially 30% HCl concentration. $Hg_2Cl_2$ is the pricipitant to effect the reduction of the aforesaid elements.

(b) Solutions of Pt, Pd and Ir chlorides, bromides and their other water-soluble compounds. In the presence of a 5% solution of $CuSO_4.5H_2O$, Pd is precipitated in the cold by $Hg_2Cl_2$, Pt is precipitated in a hot solution by $Hg_2Cl_2$ and Ir remains in solution.

(c) Solutions of Pt, Pd and Au chlorides, bromides and their other water-soluble compounds. By means of $CuSO_4.5H_2O$ and change of temperature Pt and Pd can be separated and recovered, leaving Au in solution. As an alternative, Au can be removed by oxalic acid or by any conventional means and Pt and Pd separated and recovered in a manner already described.

(d) Solutions of Au, Pt and Pd chlorides, bromides and their other water-soluble compounds can be separated from solutions of As, Se and Te by precipitating As, Pt and Pd in a substantially 2% HCl concentration with $Hg_2Cl_2$, the latter elements (As, Se and Te) remaining unreduced.

(e) Solutions of Os, Ru, Rb and Ir chlorides, bromides and their other water-soluble compounds can be separated from solutions of Au, Pt, Pd, As, Se and Te chlorides, bromides and their other water-soluble compounds because the latter group of elements is precipitated by $Hg_2Cl_2$ and the former elements do not react with $Hg_2Cl_2$.

As specifically illustrative of a practical application of the aforedescribed novel characteristics of the insoluble mercurous salts as precipitating and adsorbing agents in the presence of solutions of Au, Pt, Pd, Se, Te and As chlorides, bromides and their other water-soluble compounds, I shall now disclose my method for recovering Au from extremely dilute solutions. In sea water where the Au content approximates 3 to 5 parts per billion present methods employed for the extraction of Au are uneconomic. In my method finely pulverized $Hg_2Cl_2$ is agitated for a short period of time with the batch of sea water containing gold in solution. The particles of $Hg_2Cl_2$ with their adsorbed Au very quickly settle because of the comparatively high density of the mercurous salt. The settled mixture of Au and $Hg_2Cl_2$ is then readily separated from the bulk of the sea water by either filtration or decantation. From this recovered mixture of Au and $Hg_2Cl_2$ the $Hg_2Cl_2$ is sublimed off at a comparatively low temperature leaving the Au as a residue. The $Hg_2Cl_2$ is condensed and used again in the process. Because of the low solubility of $Hg_2Cl_2$ the loss of this salt is confined principally to that portion which is oxidized to $HgCl_2$ by an equivalent weight of Au. Furthermore, in view of following valuable properties of $Hg_2Cl_2$ that are expressed in thus precipitating Au—(1) a rapid and complete precipitation, (2) a rapid and complete adsorption, (3) a rapid and complete settling of the $Hg_2Cl_2$ with its adsorbed Au, (4) the extremely low solubility of $Hg_2Cl_2$ and its consequent loss only because of the oxidation of a quantity equivalent to the adsorbed Au and (5) the low sublimation temperature of $Hg_2Cl_2$—it is also possible to recover commercially Pt, Pd, Se, Te and As from extremely dilute solutions that have not heretofore yielded efficiently to all other known methods.

While the processes as described and exemplified are the preferred embodiment of my invention, nevertheless the same may be modified in detail without departing from the spirit and the scope of the invention as defined in the annexed claims.

Having thus described my invention, I claim as new and desire to secure by Letters Patent:

1. The process of separating As, Se, Te, Pd, Pt and Au in elemental state from solutions of their chlorides, bromides and other water-soluble compounds, which consists in bringing the said solutions in an approximately 30% HCl medium in contact with mercurous halides in excess of the quantity required by stoichiometrical calculation.

2. The process of separating As, Se, Te, Pd, Pt and Au in elemental state from solutions of their chlorides, bromides and other water-soluble compounds, which consists in bringing the said solutions in an approximately 30% HCl medium in contact with mercurous chloride in excess of the quantity required by stoichiometrical calculation.

3. The process of separating As, Se, Te, Pd, Pt and Au in elemental state from solutions of their chlorides, bromides and other water-soluble compounds, which consists in reducing the said elements from the said solutions in an approximately 30% HCl medium with mercurous halides in excess of the quantity required by stoichiometrical calculation, and in adsorbing the said reduced elements upon the said mercurous halides.

4. The process of separating As, Se, Te, Pd, Pt and Au in elemental state from solutions of their chlorides, bromides and other water-soluble compounds, which consists in reducing the said elements from the said solutions in an approximately 30% HCl medium with mercurous chloride in excess of the quantity required by stoichiometrical calculation, and in adsorbing the said reduced elements upon the said mercurous chloride.

5. The process of separating and recovering As, Se, Te, Pd, Pt and Au in elemental state from solutions of their chlorides, bromides and other water-soluble compounds, which consists in reducing the said elements from the said solutions in an approximately 30% HCl medium with mercurous halides in excess of the quantity required by stoichiometrical calculation, in adsorbing the said reduced elements upon the said mercurous halides, and in subliming off the said mercurous halides from the said precipitated elements.

6. The process of separating and recovering As, Se, Te, Pd, Pt and Au in elemental state from solutions of their chlorides, bromides and other water-soluble compounds, which consists in reducing the said elements from the said solutions in an approximately 30% HCl medium with mercurous chloride in excess of the quantity required by stoichiometrical calculation, in adsorbing the said reduced elements upon the said mercurous chloride, and in subliming off the said mercurous chloride from the said precipitated elements.

7. The process of precipitating As, Se, Te, Pd, Pt and Au in elemental state from solutions of their chlorides, bromides and other water-soluble compounds, which consists in reducing the said elements from the said solutions in an approximately 30% HCl medium with substances impregnated with mercurous halides in excess of the quantity required by stoichiometrical calculation and in adsorbing the said reduced elements upon the said impregnated substances.

8. The process of precipitating As, Se, Te, Pd, Pt and Au in elemental state from solutions of their chlorides, bromides and other water-soluble compounds, which consists in reducing the said elements from the said solutions in an approximately 30% HCl medium with colloidal substances impregnated with mercurous halides in excess of the quantity required by stoichiometrical calculation and in adsorbing the said reduced elements upon the said impregnated substances.

9. The process of precipitating As, Se, Te, Pd, Pt and Au in elemental state from solutions of their chlorides, bromides and other water-soluble compounds, which consists in reducing the said elements from the said solutions in an approximately 30% HCl medium with substances impregnated with mercurous chloride in excess of the quantity required by stoichiometrical calculation and in adsorbing the said reduced elements upon the said impregnated substances.

10. The process of precipitating As, Se, Te, Pd, Pt and Au in elemental state from solutions of their chlorides, bromides and other water soluble compounds, which consists in reducing the said elements from the said solutions in an approximately 30% HCl medium with colloidal substances impregnated with mercurous chloride in excess of the quantity required by stoichiometrical calculation and in adsorbing the said reduced elements upon the said impregnated substances.

11. The process of recovering Au dissolved in sea water which consists in bringing the said sea water in contact with mercurous chloride in excess of the quantity required by stoichiometrical calculation, said mercurous chloride reducing and adsorbing the said Au, in decanting off the said mercurous chloride and adsorbed Au, and in separating the said mercurous chloride from the said recovered Au.

12. The process of recovering Au dissolved in extremely diluted solutions which consists in bringing the said extremely diluted solutions in contact with mercurous chloride in excess of the quantity required by stoichiometrical calculation, said mercurous chloride reducing and absorbing the said Au, in decanting off the said mercurous chloride and adsorbed Au, and in separating the said mercurous chloride from the said recovered Au.

13. The process of isolating individually Au, Pt and Pd from solutions of their chlorides, bromides and other water-soluble compounds, which consists in acidifying the said solutions to a concentration of substantially 2% HCl or its pH equivalent in terms of $H_2SO_4$ or HBr, in precipitating the said Au by boiling in a substantially 5% solution of oxalic acid of its equivalent, in filtering off the said Au, in destroying the excess of the said oxalic acid or its equivalent, in treating the said filtrate with $CuSO_4.5H_2O$ in a quantity to make a substantially 5% solution, in precipitating the said Pd in a cold solution with $Hg_2Cl_2$ in excess of the quantity required by stoichiometrical calculation, in filtering off the said Pd, in precipitating the said Pt from the hot filtrate with $Hg_2Cl_2$ and in filtering off the said Pt.

14. The process of isolating individually Se, Te and As from solutions of their chlorides, bromides and other water-soluble compounds which consists in acidifying the said solutions to a concentration of substantially 16% HCl or its pH equivalent in terms of $H_2SO_4$ or HBr, in treating the said solution with $NaHSO_3$ in a quantity to make a substantially 5% solution, in precipitating the said Se by gentle boiling, in filtering off the said Se, in precipitating from the filtrate the said Te with $Hg_2Cl_2$ in excess of the quantity required by stoichiometrical calculation, in filtering off the said Te, in acidifying the filtrate to a concentration of substantially 30% HCl or its pH equivalent in terms of $H_2SO_4$ or HBr, in precipitating the said As with $Hg_2Cl_2$ in excess of the quantity required by stoichiometrical calculation and in filtering off the said As.

15. The process of separating and recovering individually Au, Pt, Pd, Se, Te, and As from mixed solutions of their salts and of the salts of Os, Ru, Rb, and Ir, which consists in acidifying the said solutions to a concentration of substantially 2% HCl or its pH equivalent in terms of $H_2SO_4$ or HBr, in precipitating combinatively the said Au, Pt and Pd with $Hg_2Cl_2$ in excess of the quantity required by stoichiometrical calculation, in filtering off the said Au, Pt, Pd and $Hg_2Cl_2$, in subliming off the said $Hg_2Cl_2$, in suitably dissolving the said Au, Pt and Pd, in acidifying the said solutions to a concentration of substantially 2% HCl or its pH equivalent in terms of $H_2SO_4$ or HBr, in precipitating the said Au by boiling in a substantially 5% solution of oxalic acid or its equivalent, in filtering off the said Au, in destroying the excess of the said oxalic acid or its equivalent, in treating the said filtrate with $CuSO_4 5H_2O$ in a quantity to make a substantially 5% solution, in precipitating the said Pd in a cold solution with $Hg_2Cl_2$ in excess of the quantity required by stoichiometrical calculation, in filtering off the said Pd, in precipitating the said Pt from the hot filtrate with $Hg_2Cl_2$ in excess of the quantity required by stoichiometrical calculation, in filtering off the said Pt, in acidifying the filtrate from the said Au, Pt, Pd and $Hg_2Cl_2$ to a concentration of substantially 16% HCl or its pH equivalent in terms of $H_2SO_4$ or HBr, in treating the said solution with $NaHSO_3$ in a quantity to make a substantially 5% solution, in precipitating the said Se by gentle boiling, in filtering off the said Se, in precipitating from the filtrate the said Te with $Hg_2Cl_2$ in excess of the quantity required by stoichiometrical calculation, in filtering off the said Te, in acidifying the filtrate to a concentration of substantially 30% HCl or its pH equivalent in terms of $H_2SO_4$ or HBr, in precipitating the said As with $Hg_2Cl_2$ in excess of the quantity required by stoichiometrical calculation and in filtering off the said As, leaving the said Os, Ru, Rb and Ir in the last filtrate.

GORDON GREEN PIERSON.